April 24, 1962   J. RABINOW   3,031,196
TONE ARM DAMPER
Filed June 15, 1960
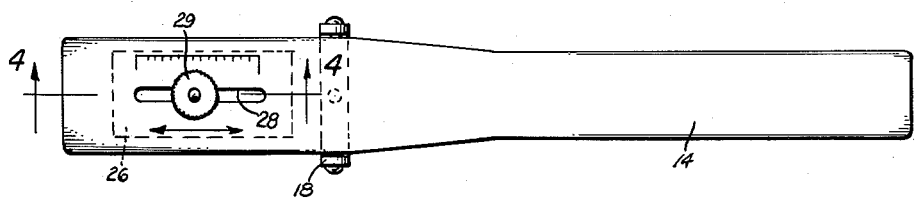
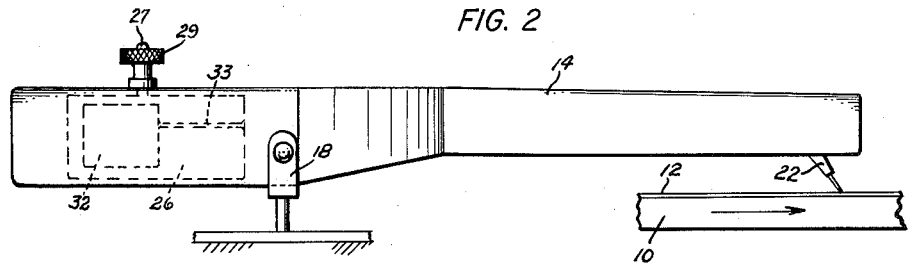
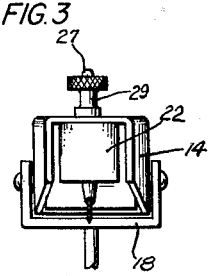
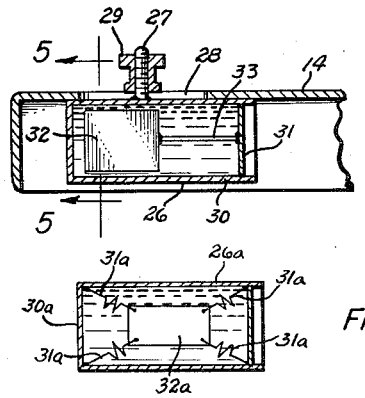
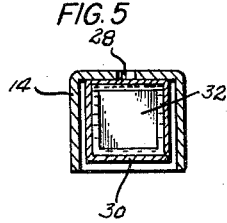
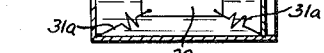
Jacob Rabinow
INVENTOR
BY Joseph A. Genovese
ATTORNEY

United States Patent Office

3,031,196
Patented Apr. 24, 1962

3,031,196
TONE ARM DAMPER
Jacob Rabinow, Takoma Park, Md., assignor to Rabinow Engineering Co., Inc., Rockville, Md.
Filed June 15, 1960, Ser. No. 36,264
7 Claims. (Cl. 274—23)

This invention relates to sound reproducing equipment and more particularly to vibration damped tone arms and devices to damp unwanted vibration in conventional or special tone arms.

An ordinary tone arm in record playing equipment is subjected to vibrations through the entire frequency range. The vibration is induced by the coupling between the stylus and the arm. This coupling is usually a spring compliance with a very small amount of damping. The stylus can be considered as the point of reference and the arm as a moving mass coupled with the stylus spring system. Any disturbance of the stylus causes the arm to vibrate and resonate at one or more frequencies. These vibrations sometimes reach large amplitudes and have many undesirable effects. In poorly designed arms, these frequencies may be in the audio range giving exaggerated response at bass frequencies causing large amounts of wear and occasionally causing the stylus to jump out of the record groove. In well designed arms, the resonance frequency of the arm against the stylus compliance usually lies below the audio range and while the direct output may not be heard, the output may be of sufficient amplitude to overload the amplifier or to modulate the signals causing very objectionable forms of distortion. The modulation may occur either in the pick up itself or in the amplifier.

Another form of arm vibration which is less known is tortional vibration in the arm caused by the fact that the stylus tip is external to the center of rotation of the arm. The motion can and often does induce tortional vibrations. Depending on the arm construction, these vary in amplitude. Some arms are quite flexible in torque while other, particularly of tubular construction, are quite rigid. My damper is designed so that it will absorb energy of the tortional vibration as well as energies due to translational vibrations. Even though an arm is normally mounted on pivots which do not permit great freedom in the tortional mode, the pivots, themselves, are generally speaking as flexible as the arm so that the whole structure can vibrate in tortion. In the embodiments shown herein, the weight is free to rotate on a spring suspension. Such rotation causes energy loss in the viscous fluid surrounding the mass. This acts to dampen this vibration as well as others.

Many different forms of arm damping have been employed in the past. For example, viscous damping in the bearing pivots of the arm have been employed. This is not the most desirable because the arm should be very free to move both for small translation motion of the pick up and because records are not usually perfectly round or perfectly centered. This causes the arm to have a low frequency oscillation which has no relationship to the audio and which should be done with as little impedance as possible.

There is also the art of oscillation dampers generally related to this invention which work in a single degree of freedom because formerly most of the attention was focused on either lateral recording or hill-and-dale recording. It is the main purpose of my invention to develop a combination counterweight and vibration damper which will be effective against vertical, horizontal and tortional vibration. Another purpose of the invention is to produce tone arm damping for pick ups playing either monoral or stereo records where both up and down and lateral motions are of importance.

A further object of my invention is to produce damping which will extend down to the very lowest frequencies but can be made negligible at or near zero frequency or in other words, be negligible for ordinary translation or slow oscillations of the arm that occur due to the eccentricities of the record.

Another object of this invention is to use the mass that is required in this type of damper to serve as a counterbalance as well.

Another object of the invention is to provide a tone arm with a damper that obviates undesirable resonance effects by means of a mass suspended in a dampening fluid.

Briefly, the nature of the invention expressed in terms of a structural embodiment, of which there are many, would be a mass suspended in fluid by means of one or more springs. The natural frequency of the mass suspended in the fluid can be fixed within a desired range of frequencies. Since particular difficulties are encountered at very low frequencies, to exemplify the invention, the range may be of the order of a single cycle to about 20 cycles per second.

Many high quality tone arms are counterbalanced so that the stylus force on the record is only a few grams. Since one form of my damper is rigid in the fore and aft direction, the damper automatically functions as a fixed counterbalance for the tone arm when the damper is attached to the tone arm or otherwise associated with the tone arm on one side of the tone arm pivot and the transducer is on the other side of the same pivot.

Other objects and features of importance will become apparent in following the description of the illustrated forms of the invention.

FIGURE 1 is a diagrammatic top view showing a tone arm equipped with a damper in accordance with the invention.

FIGURE 2 is a side view of the tone arm.

FIGURE 3 is an end view of the tone arm.

FIGURE 4 is a sectional view taken on the line 4—4 of FIGURE 1.

FIGURE 5 is a sectional view taken on the line 5—5 of FIGURE 4.

FIGURE 6 is a sectional view showing the modification.

The accompanying drawing shows a turntable 10 provided with a conventional record 12. Tone arm 14 is supported by a universal pivot structure 18 enabling the tone arm to swing in the plane of the record and to swing in a direction at an angle to the plane of the record. Transducer 22, including its stylus which tracks in the record groove, is conventional, and the same holds true for the relationship that the tone arm bears to the turntable and record. Further, record 12 may be an ordinary monoral or stereo, lateral or hill-and-dale type.

Damper 26 (FIGURES 1–5) is attached to the tone arm on the side of pivot structure 18 opposite to the transducer so that the weight of the damper functions as a counterbalance. Therefore, it is preferred that damper 26 be adjustably supported in a simple manner, for instance by screw 27 passing through slot 28 in the tone arm and having a nut or the like on the screw and bearing against a surface of the tone arm. For convenience, graduations are on the tone arm to indicate the position of the damper.

Damper 26 is constructed of a casing 30 containing a damping fluid, for instance oil. Since there is customarily no temperature problem, ordinary oil may be used without experiencing objectionable viscosity changes. In special cases, silicone liquids may be employed. Mass 32 is immersed in the oil and supported by one or more spring members. In the embodiment of FIGURES 1–5 the mass supporting spring member 33 is a cantilevered spring wire secured at one end to the wall 31 of casing 30 and secured at the other end to the mass. The material of the mass is arbitrarily selected, practically any metal being suitable for the purpose. However, the mass must be such that the damper resonates at the desired frequency.

The modification in FIGURE 6 shows another way of constructing a damper 26a which responds to very low frequencies, for instance frequencies of the order of 1 to 10 cycles per second. Instead of having a cantilevered spring member such as shown in FIGURES 1–5, a number of coil springs 31a are secured at their inner ends to the weight 32a and at their outer ends to the walls of casing 30a.

In use, the damper is secured to the tone arm on one side of the pivot structure while the transducer is on the opposite side of the same structure. This enables the damper to function both as a damper and as a counterbalance. However, it is pointed out that the damper may be secured to the tone arm in other positions. Further, it is unnecessary to have the damper made as an attachment to be secured to the tone arm. Even though this is thought to be a very practical method of assembly, should it be desirable, the casing may be constructed as an integral part of the tone arm or simply as a cavity formed in the tone arm with a damping fluid placed in the cavity and held by means of a plug which supports the spring member with a weight thereon.

The transducer stylus tracks on the record in the usual way while the mass remains static in the damping fluid. Above a given frequency range, this static condition of the mass enables the entire damper to function as a counterbalance without the energy absorbing function. However, when the tone arm vibrates either because of the forces exerted by the stylus reproducing the information of the record or for any other reason such as cabinet resonance, the mass begins to vibrate in the damping fluid. Consequently, the damping fluid functions as an energy absorber thereby suppressing the tone arm oscillations, which if left unsuppressed cause large oscillatory excursions which distort the reproduction and may actually cause the stylus to jump out of the record groove.

It is specifically pointed out that the mass is supported in such a way that it is capable of oscillating in many directions. Consequently, it may cancel horizontal, vertical, all included angles therebetween, and tortional tone arm vibrations. This is of particular merit for stereo records where oscillations in a direction at an angle to the plane of the record are as important to suppress as oscillations parallel to the plane of a monoral record.

The illustrated and described forms of my invention are given as non-exclusionary examples. All modifications within the scope of the following claims may be resorted to without departing from the protection thereof.

I claim:
1. In a sound reproducing apparatus having a movable tone arm provided with a transducer adapted to be excited by the modulated grooves of a record, a damper comprising a mass, a casing containing a damping fluid, and resilient means secured to said casing and mounting said mass in the fluid for mechanical oscillatory movement to damp the tone arm and thereby at least reduce the tendency of oscillatory excursions of the tone arm.

2. The subject matter of claim 1 wherein the record is a multi-channel single track record, and one of direction of said excursions is in a line transverse to the plane of the record.

3. In sound reproducing equipment which has a tone arm provided with a pickup adapted to be excited by the modulated grooves of a record and wherein the tone arm is subject to vibratory excursions in more than one direction, the improvement comprising a self-contained damper having a casing supported by and subject to the vibrations of the tone arm, a mass in said casing, an energy absorbing fluid in said casing, at least one metallic spring member secured to said casing and mounting said mass in said fluid for movement in many directions, the natural frequency of said mass occurring within a predetermined range of vibratory frequencies to damp the tone arm vibrations which cause said excursions.

4. The apparatus of claim 1 wherein said resilient means include an elongate spring member having a longitudinal axis approximately parallel to the plane of at least a portion of the tone arm.

5. The apparatus of claim 1 wherein said resilient means include a plurality of spring members secured to said mass.

6. A damper for a tone arm, said damper comprising a casing connected with the tone arm so as to be subject to the vibratory motion of the tone arm, a viscous damping liquid confined in said casing thereby also being subject to the vibratory motion of the tone arm, at least one spring member secured at one end to and located within said casing, and a mass disposed within said casing and suspended in said liquid by being attached to said spring.

7. In a tone arm having a pick up at one end and a pivot intermediate its ends, a viscous damper at the opposite end of the tone arm, said pick up comprising a hollow casing, means to attach said casing to the tone arm for adjustment along the length of the tone arm, a viscous liquid confined within said casing, an elongate metallic spring member secured to said casing and located therein, a mass disposed in the liquid within said casing and spaced from the walls of the casing for freedom of motion within said liquid, and said spring member attached to said mass to structurally support said mass by said casing.

References Cited in the file of this patent

UNITED STATES PATENTS

| | | |
|---|---|---|
| 1,883,100 | Terrell | Oct. 18, 1932 |
| 2,257,028 | Westerkamp | Sept. 23, 1941 |
| 2,819,087 | Cerone | Jan. 7, 1958 |